May 15, 1962   B. W. HUSTON   3,034,801
SPORTSMAN'S CART
Filed July 6, 1959   2 Sheets-Sheet 1
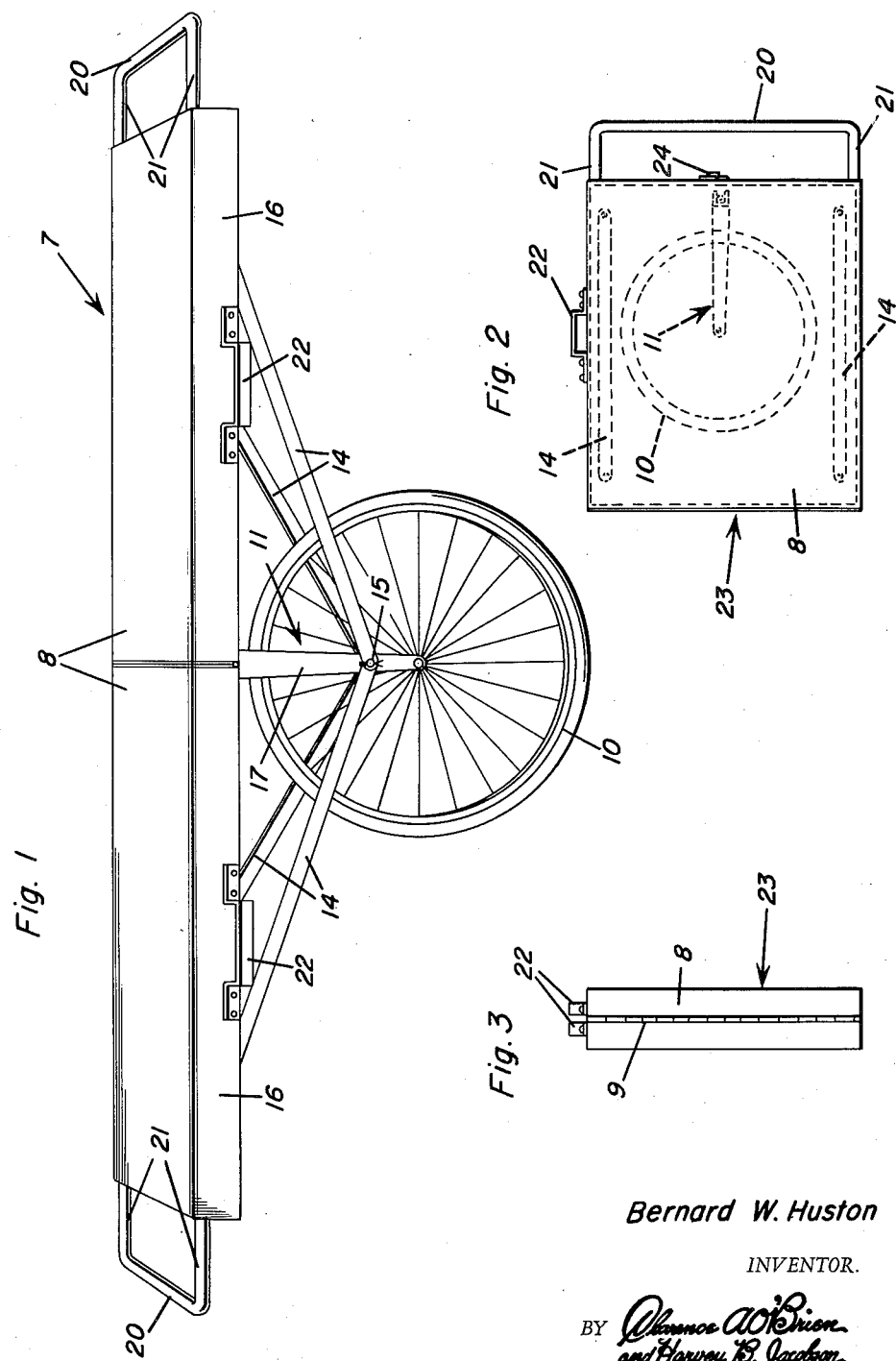
Bernard W. Huston
INVENTOR.

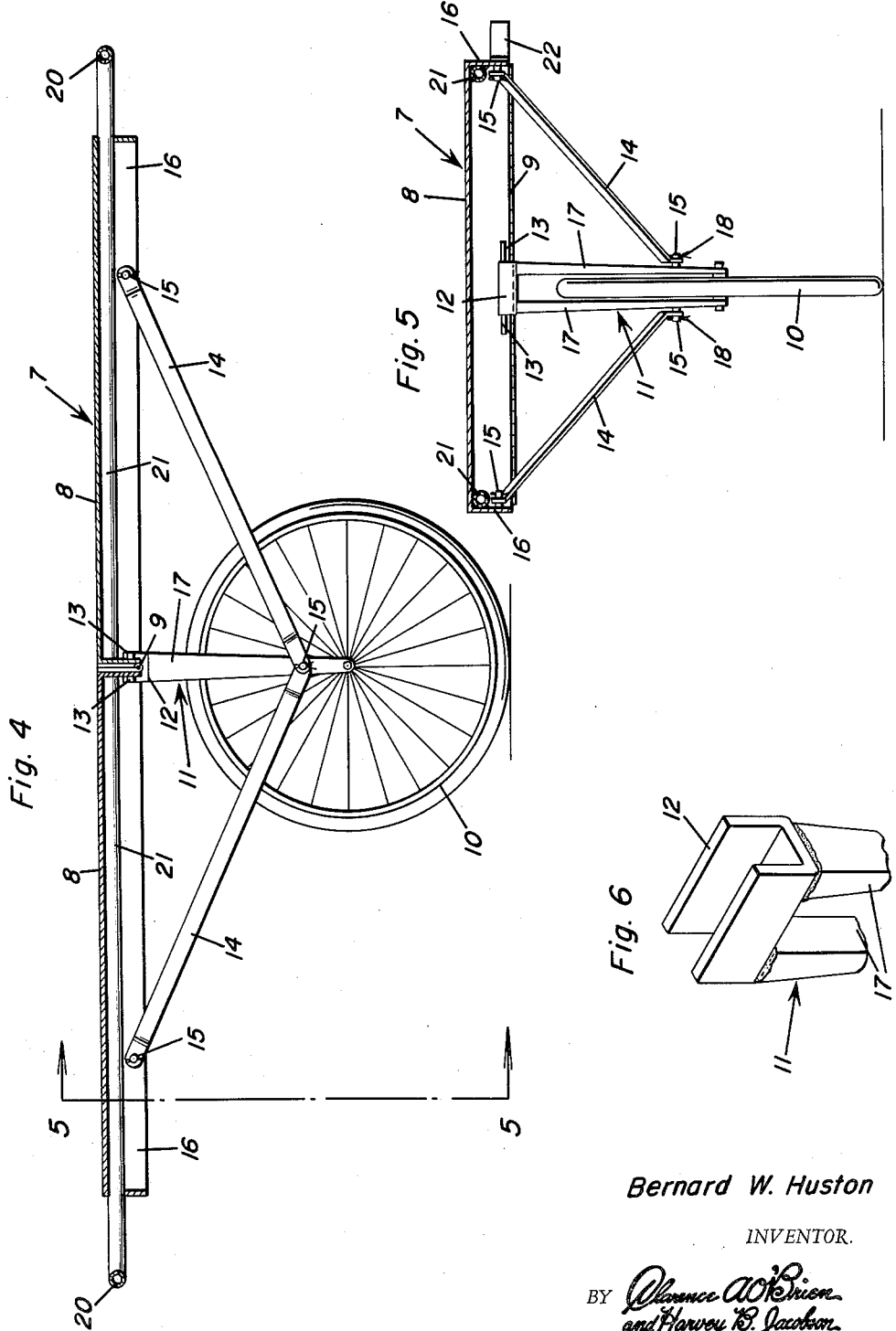

United States Patent Office 3,034,801
Patented May 15, 1962

3,034,801
SPORTSMAN'S CART
Bernard W. Huston, 2711 Jefferson St., Boise, Idaho
Filed July 6, 1959, Ser. No. 825,345
4 Claims. (Cl. 280—37)

This invention relates to new and useful improvements in sportsman's carts of the mono-wheel type and has for its primary object to provide, in a manner as hereinafter set forth, novel means for transporting game, camping equipment, etc., over mountain trails and other difficult terrain.

Another very important object of the present invention is to provide a vehicle of the aforementioned character which, when not in use, may be compactly folded for carrying or storing.

Another important object of the invention is to provide a sportsman's cart of the character described which may be operated by one or two persons with a minimum of effort.

Still another object of the present invention is to provide a game, etc., cart of the character set forth which may also function as a litter.

Other objects of the invention are to provide a foldable sportsman's cart which will be of relatively simple construction, strong, durable, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a sportsman's cart constructed in accordance with the present invention;

FIGURE 2 is a view in side elevation of the device when folded;

FIGURE 3 is an end elevational view of the folded device;

FIGURE 4 is a view in vertical longitudinal section through the cart;

FIGURE 5 is a view in transverse section, taken substantially on the line 5—5 of FIGURE 4; and FIGURE 6 is a perspective view of the upper portion of the wheel fork.

Referring now to the drawing in detail, it will be seen that the embodiment of the invention which has been illustrated comprises an elongated platform of suitable metal which is designated generally by reference character 7. The platform 7, which may also be of any desired dimensions, is foldable, said platform including a pair of duplicate, rectangular, shallow box-like sections 8 having one end hingedly connected at 9.

A single removable wheel 10 supports the platform 7. The supporting wheel 10 is journaled in a fork 11. The fork 11 includes a channel shaped bight portion or saddle 12 in which the hingedly connected end portions of the platform sections 8 are engaged. Lugs or stops 13 on the platform 7 retain the channel bar or saddle 12 against sliding movement.

Removable braces 14 extend between the fork 11 and the end portions of the platform 7. The end portions of the removable braces 14 are apertured to receive pegs or the like 15 on the side portions 16 of the platform sections 8 and on the lower portion of the legs or tines 17 of the fork 11. Cotter pins 18 secure the braces 14 on the pegs 15.

Projecting from the free or outer ends of the platform sections 8 are substantially U-shaped handles 20 of tubular metal. As shown to advantage in FIGURE 5 of the drawing, the legs 21 of the handles are secured by welding in the longitudinal corner portions of the platform sections 8. Mounted on one side of the platform sections 8 is a pair of substantially U-shaped carrying handles 22.

It is thought that the use of the vehicle will be readily apparent from a consideration of the foregoing. Of course, the load to be transported is placed on the platform 7 and the cart is operated by one or two persons through the medium of the handles 20. To fold the device to be transported or stored, it is only necessary to remove the braces 14 and detach the fork 11 with the wheel 10 thereon. The braces 14 and the fork 11 with the wheel 10 are then placed in one of the box-like sections 8 of the platform 7. The other section 8 is then closed in an obvious manner for providing what may be considered a carrying case 23 (see FIGURES 2 and 3). Folding the sections 8 in the manner described brings together the handles 22 which facilitate transporting the device. A suitable latch 24 is provided for securing the sections 8 in closed position. The generally U-shaped operating handles 20 also materially strengthen and stiffen the platform 7. The generally channel shaped bight portion or saddle 12 of the fork 11 also assists in securing the platform sections 8 in open or unfolded position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A sportsman's cart comprising: an elongated foldable platform, a removable fork mounted beneath said platform, said fork including a generally channel-shaped bight portion, said platform including a pair of complementary, shallow box-like rectangular sections comprising hingedly connected ends engaged in said bight portion of said fork, removable braces extending between the fork and the outer end portions of the sections, generally U-shaped operating handles projecting from the outer ends of the sections and comprising legs fixed in the longitudinal corner portions of said sections, and a supporting wheel for the platform journaled in the fork.

2. A sportsman's cart comprising a platform including a pair of generally rectangular sections hingedly connected at one end, a depending fork removably mounted beneath and supporting the sections at the hinged juncture thereof, a ground wheel journaled in said fork, and means detachably securing the fork to the platform, said sections, when said fork is removed, being foldable into opposed, abutting engagement with each other for providing a closed case.

3. A sportsman's cart comprising a platform including a pair of generally rectangular sections hingedly connected at one end, a depending fork removably mounted beneath and supporting the sections at the hinged juncture thereof, a ground wheel journaled in said fork, and means detachably securing the fork to the platform, said means including removable braces extending between and detachably secured to the fork and the free end portions of the sections, said sections being foldable into opposed, abutting engagement with each other for providing a closed case when the fork and the braces are removed.

4. A sportsman's cart comprising a platform including a pair of generally rectangular sections hingedly connected at one end, a depending fork detachably secured beneath the platform and including a substantially channel-shaped bight portion removably receiving therein the hinged juncture of the sections for supporting said sections at said hinged juncture thereof, and means removably securing the fork to the platform, said sections being foldable into opposed, abutting engagement with each other for providing a closed case when the fork is removed.

References Cited in the file of this patent

UNITED STATES PATENTS

| | | |
|---|---|---|
| 1,483,607 | Liedtke | Feb. 12, 1924 |
| 2,416,492 | Neeley | Feb. 25, 1947 |
| 2,429,028 | Neeley | Oct. 14, 1947 |
| 2,546,604 | Lafky | Mar. 27, 1951 |
| 2,636,748 | Giovannoni | Apr. 28, 1953 |
| 2,726,874 | Sullivan | Dec. 13, 1955 |

FOREIGN PATENTS

| | | |
|---|---|---|
| 7,365 | Great Britain | of 1915 |
| 545,141 | France | July 13, 1922 |
| 573,486 | France | Mar. 12, 1924 |
| 813,507 | France | Feb. 22, 1937 |